United States Patent [19]

Shapler

[11] Patent Number: 4,802,833
[45] Date of Patent: Feb. 7, 1989

[54] ACCUMULATOR HEAD FOR PRODUCING A STORAGE DRUM WITH VIEW STRIPE

[75] Inventor: Thomas A. Shapler, Bowling Green, Ohio

[73] Assignee: Hoover Universal, Inc., Ann Arbor, Mich.

[21] Appl. No.: 170,784

[22] Filed: Mar. 21, 1988

[51] Int. Cl.⁴ .................................. B29C 47/06
[52] U.S. Cl. .................... 425/131.1; 264/173; 264/209.8; 264/541; 425/326.1; 425/376.1; 425/462; 425/467; 425/532; 428/36.9; 428/36.92
[58] Field of Search ............. 425/72.1, 326.1, 133.1, 425/532, 462, 465, 376.1, 467, 131.1; 215/1 C; 264/173, 540, 541, 209.8, 177.2, DIG. 57; 428/35, 36

[56] References Cited

U.S. PATENT DOCUMENTS

| | | | |
|---|---|---|---|
| 3,326,399 | 6/1967 | Ausnit | 264/209.8 X |
| 3,334,168 | 8/1967 | Majewski et al. | 264/209.8 X |
| 4,297,092 | 10/1981 | Goron | 425/532 X |
| 4,302,170 | 11/1981 | Goron | 425/532 X |
| 4,422,838 | 12/1983 | Iwawaki et al. | 425/532 X |
| 4,507,071 | 3/1985 | Hahn et al. | 264/173 X |
| 4,548,569 | 10/1985 | Pitigliano et al. | 425/133.1 |
| 4,609,340 | 9/1986 | Irwin et al. | 425/532 |
| 4,655,987 | 4/1987 | Zertuche | 264/209.8 X |
| 4,717,326 | 1/1988 | Motonaga et al. | 425/462 X |

Primary Examiner—Richard L. Chiesa
Attorney, Agent, or Firm—Harness, Dickey & Pierce

[57] ABSTRACT

An accumulation head for a blow molding machine which produces a parison of a first melt material having a stripe of a second extruded plastic material formed by directing a second extruded plastic material into the stream of a first plastic material as the material in the accumulator is extruded to form the parison.

3 Claims, 3 Drawing Sheets

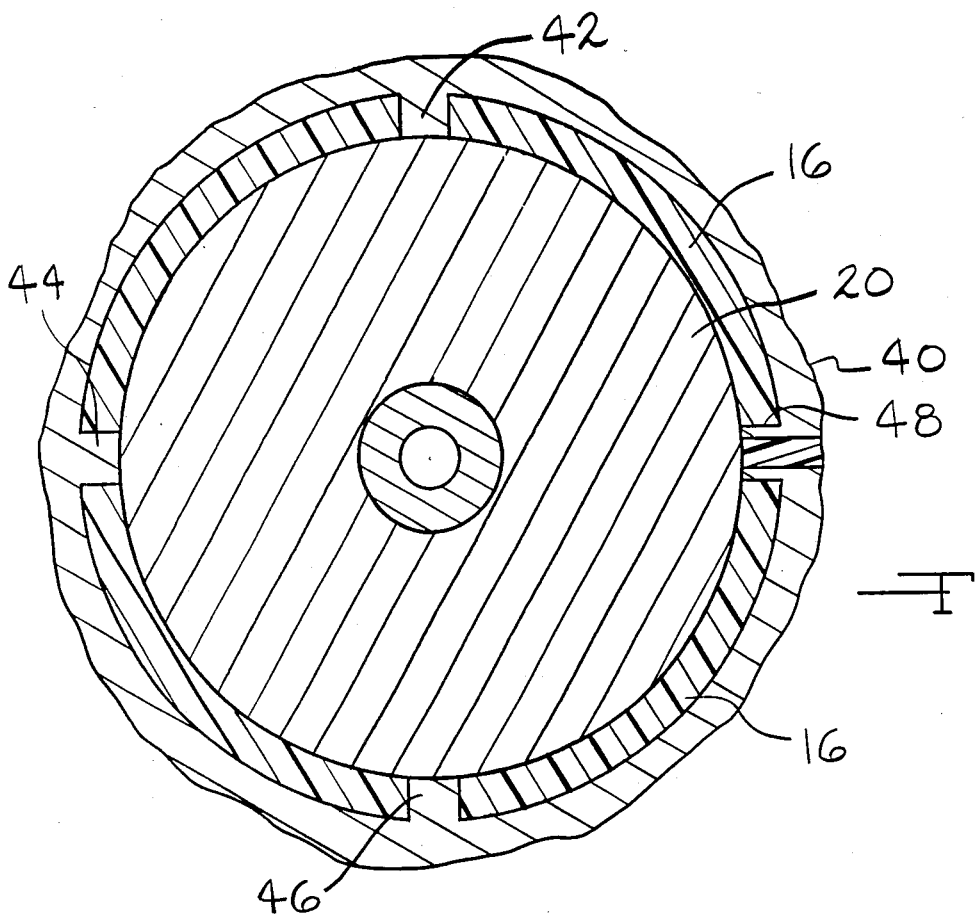
FIG. 3
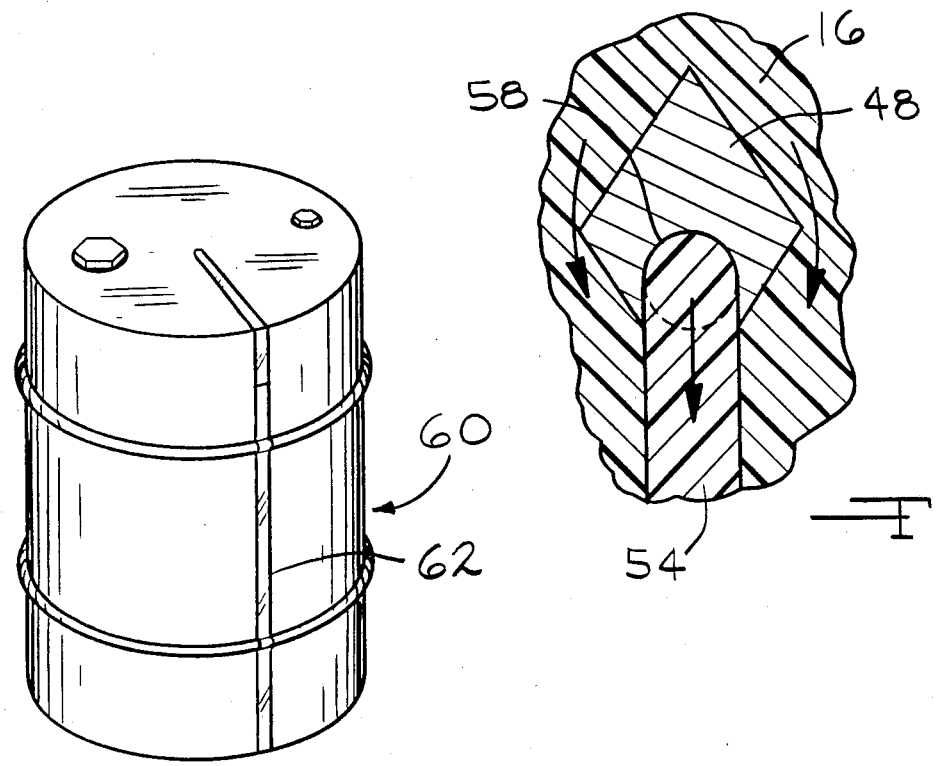
FIG. 4
FIG 5

ACCUMULATOR HEAD FOR PRODUCING A STORAGE DRUM WITH VIEW STRIPE

BACKGROUND AND SUMMARY OF THE INVENTION

This invention relates generally to blow molding machines and more particularly to an extrusion head of the accumulator type for forming a parison tube having a transparent view stripe in the body of the tube.

Colored plastic containers are generally opaque and therefore the level of contents within the container cannot be directly ascertained when viewed form the outside. One solution is to form the container from clear plastic material and provide a sleeve cover or film of colored material having a thin vertical transparent strip so that the container has what appears to be a clear vertical view stripe in its side. This approach has a disadvantage that the container must have a separately applied colored sleeve or wrapping, which adds to the cost and complicates the production process.

The principal object of this invention therefore is to provide an improved accumulator head which forms a tube with an integral view stripe in a single operation.

The accumulator head utilized in this invention is a modification of a conventional accumulator head. Such an accmulator head having a diverter sleeve to eliminate weld line formation is fully described in U.S. Pat. No. 4,609,340, commonly assigned, and incorporated herein by reference.

The present invention includes the additional feature of a second inlet orifice located between the accumulation chamber and the outlet orifice of the accmulator head for injection of a second plastic material into the flow stream of plastic material being extruded through the outlet orifice whereby the extruded plastic flowing out of the annular outlet orifice forms a tube having an integral vertical stripe composed of the second plastic material.

The injection of the second plastic material through the second inlet orifice is timed to coincide with the discharge of melt from the accumulation chamber.

The result is an improved accumulator head which enables the production of a high quality molded container such as a storage drum having a portion of its wall composed of a different plastic material such as a transparent plastic stripe allowing visual observation of the level of contents within the container.

Further objects, features and advantages of the invention will become apparent from a consideration of the following description and the appended claims when taken in connection with the accompanying drawing.

BRIEF DESCRIPTION OF THE DRAWINGS

FIG. 2A is an enlarged fragmentary sectional view of the second inlet orifice area in the accumulator shown in FIG. 1;

FIG. 3 is an enlarged fragmentary sectional view of the accumulator head showing the second inlet orifice area as seen from substantially the line 3—3 in FIG. 2;

FIG. 4 is a fragmentary enlarged sectional view of the second inlet orifice area of the accumulator head as seen from the line 4—4 in FIG. 2A; and FIG. 5 is a perspective view of a storage drum formed using the accumulator head of the present invention showing the vertical view stripe.

DETAILED DESCRIPTION OF THE INVENTION

Figure 1:
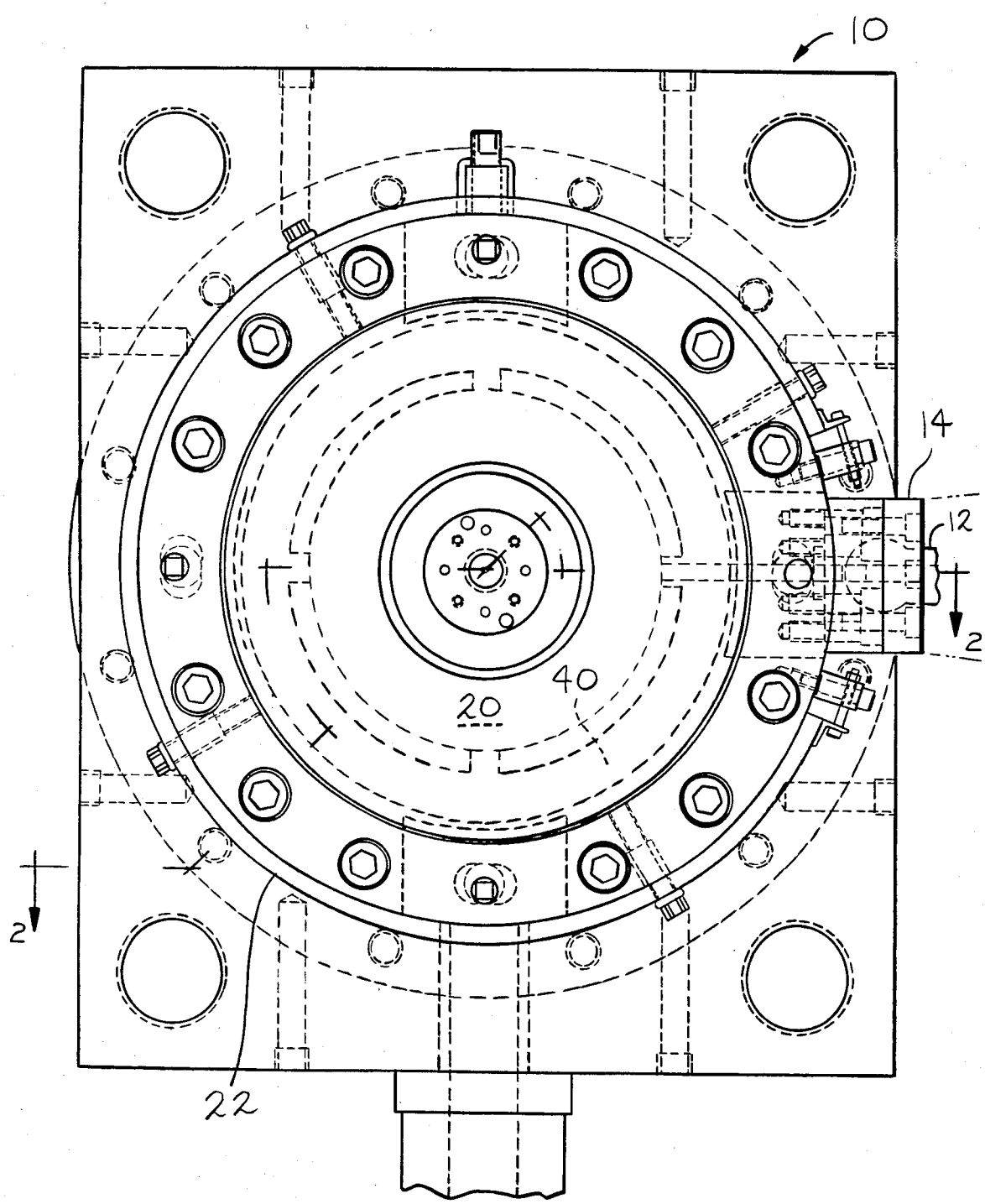
FIG. 1 is a top view of the accumulator head of the present invention.
Figure 2:
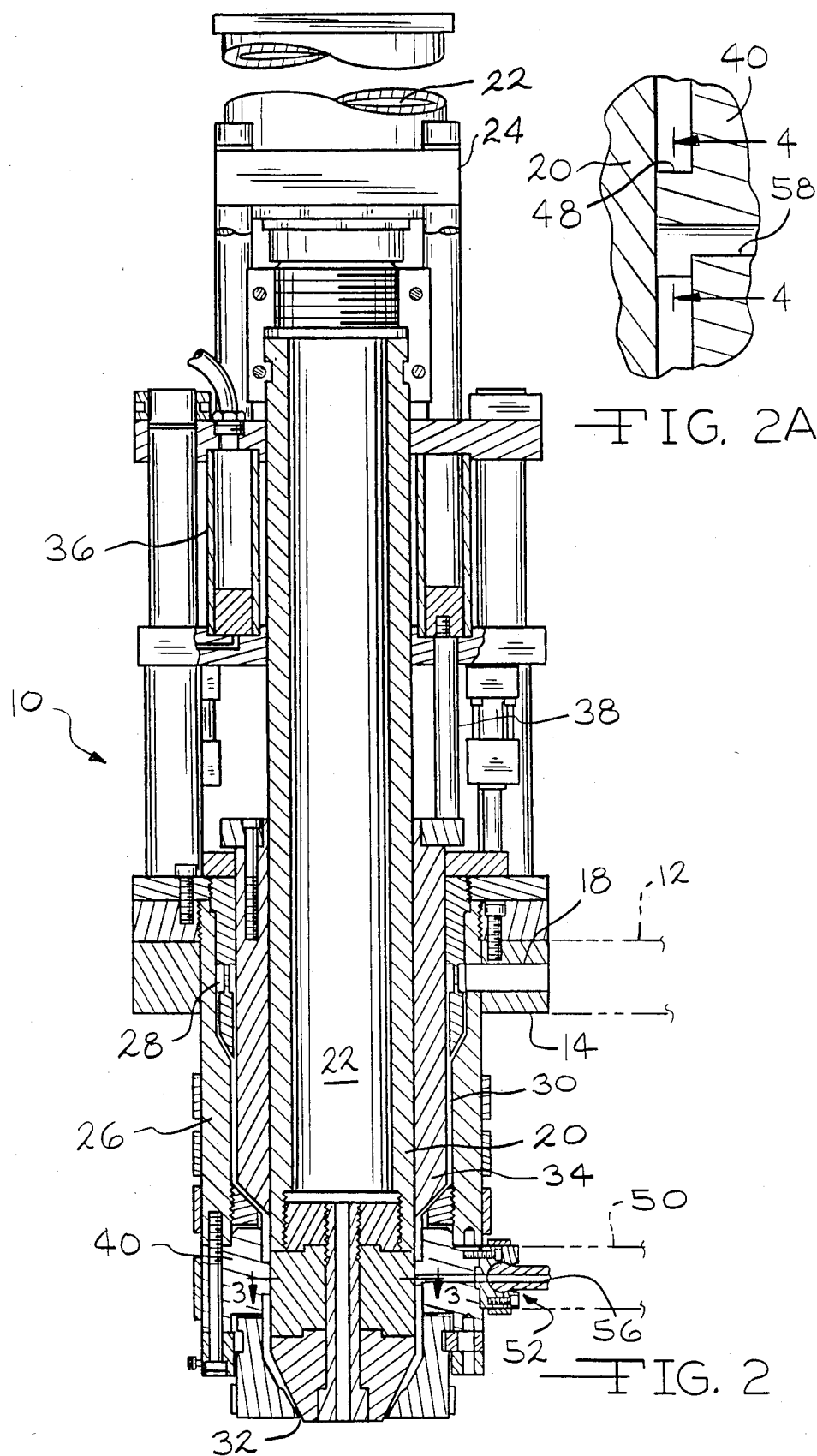
FIG. 2 is a vertical sectional view of the accumulator head of this invention as seen from substantially the line 2—2 in FIG. 1 showing the accumulator piston in its discharge position.

With reference to the drawing, the accumulator head of this invention, indicated generally at 10, is shown in FIGS. 1 and 2 connected to a first extruder 12 by a first inlet body member 14. The extruder 12 provides a continuous flow of first molten thermoplastic material 16, preferably an opaque material, to the accumulator head 10 through an inlet passage 18 in body member 14.

The accumulator head 10 includes a die mandrel 20 that has an air conduit 22 extending axially therethrough to a conventional blow pin (not shown). Mandrel 20 is connected at its upper end to an adjustment cylinder 24 capable of moving the mandrel 20 for up and down directions. A die body 26 is supported in spaced relation around die mandrel 20 so as to define therewith in series an annular inlet orifice 28, an annular accumulation chamber 30 and annular outlet orifice 32. Annular piston 34 is slidably mounted on the mandrel 20 for up and down movement. When the annular piston 34 is moved downwardly from its retracted position toward its discharge position, it is operable to force molten plastic downwardly through the outlet orifice 32 so as to form a downwardly extending parison. A hydraulic cylinder 36 has a piston rod 38 connected to the piston 34 for moving the piston 34 downwardly.

Operation of the accumulator head thus described is as decribed in U.S. Pat. No. 4,609,340.

Located around the lower end of the die mandrel 20 is a ring shaped die ring 40 having four equally spaced guide portions 42, 44, 46, and 48. These guide portions are diamond shaped in vertical cross section as shown in FIG. 4 to smoothly split the flow of melt as the melt is pushed by piston 34 past guide portions 42, 44, 46, and 48.

A second conventional extruder 50 is connected to die ring 40 by a second inlet body member 52. The second extruder 50 provides an intermittent flow of a second extruded thermoplastic melt material 54, preferably a transparent material, to extrusion head 10 through a second inlet passage 56 in second inlet body member 52 and a passage 58 in die ring 40. Passage 58 extends through die ring 40 and through the underside of guide portion 48. Passage 58 opens to the inside of the die ring 40 and the underside of guide portion 48 as shown in FIGS. 3 and 4.

The injection of the second melt material 54 via second extruder 50 is timed to coincide with the passage of first plastic melt 16 by mandrel 20 and out annular outlet orifice 32 to form a tubular parison having a vertical strip of second melt material 54 which then is blown to form the storage drum 60 having an integral view stripe 62 as shown in FIG. 5.

While the invention has been described particularly with respect to forming a container with a view stripe, it is to be understood that the invention can be practiced without the second melt material 54 being transparent.

From the above description it is seen that this invention provides an improved accumulator head 10 which is operable to form a parison extruded by the head 10 having a portion of the body of the parison formed from a second molten plastic material such that a container having a transparent view stripe can be produced in a single operation.

The instant invention has been described in an illustrative manner and it is to be understood that the terminology that has been used is intended to be in the nature of words of description rather than of limitation. Obviously many modifications and variations of the present invention are possible in light of the above teachings. It is, therefore understood that within the scope of the appended claims, the invention may be practiced otherwise than as specifically described.

What is claimed is:

1. In an accumulator head for a blow molding machine for extruding a tube of plastic material wherein said head includes a mandrel, a die body enclosing said mandrel to define therewith an annular outlet orifice, a first inlet orifice, an annular accumulation chamber in communication with and located between said inlet and outlet orifices, and an annular piston movable in said accumulation chamber so as to discharge accumulated first plastic material therein through said outlet orifice, means operatively associated with said mandrel and said die body between said accumulation chamber and said outlet orifice to form a radially extending split in said first plastic material as said first plastic material is discharged through said outlet, a second inlet orifice for injection of a second plastic material into said split in the flow stream of said first plastic material as said first plastic material exits through said outlet orifice whereby the total extruded plastic flowing out of the annular outlet orifice forms a tube having a strip of said second plastic material in said tube extending longitudinally thereof.

2. The structure according to claim 1 wherein said second inlet includes an annular die ring positioned around said die mandrel and having directed guide portions extending toward said mandrel and positioned in said flow stream of said first plastic material, means forming a passage in and extending through one of said guide portions, said die ring passage opening to the inside of said die ring on the underside of said one of said guide portions for directing said second extruded plastic material into the stream of first plastic material as said annular piston pushes said first plastic material past said die ring and around said one die portion for flow out said annular outlet orifice to form said plastic tube.

3. The structure according to claim 2 wherein each guide portion has a generally elongated diamond shaped cross section oriented coaxially with said stream so as to create minimal turbulence in said stream.

* * * * *